United States Patent [19]

Hulsey

[11] Patent Number: 5,264,776
[45] Date of Patent: Nov. 23, 1993

[54] ELECTRIC VEHICLE INDUCTIVE COUPLING CHARGE PORT

[75] Inventor: Stephen J. Hulsey, Los Angeles, Calif.

[73] Assignee: Hughes Aircraft Company, Los Angeles, Calif.

[21] Appl. No.: 906,599

[22] Filed: Jun. 30, 1992

[51] Int. Cl.$^5$ ............................................. H02J 7/00
[52] U.S. Cl. ............................................. 320/2; 320/21
[58] Field of Search ................................... 320/2, 21

[56] References Cited

U.S. PATENT DOCUMENTS

| | | | |
|---|---|---|---|
| 3,529,229 | 9/1970 | Kennedy | 320/2 |
| 3,938,018 | 2/1976 | Dahl | 320/2 |
| 4,052,655 | 10/1977 | Vizza | 320/2 |
| 4,158,802 | 6/1979 | Rose | 320/2 |
| 4,184,580 | 1/1980 | Ellis, Jr. | 320/2 X |
| 4,347,472 | 8/1982 | Lemelson | 320/2 |
| 4,383,210 | 5/1983 | Wilkinson | 320/2 |
| 4,496,896 | 1/1985 | Melocik et al. | 320/2 |
| 4,532,418 | 7/1985 | Meese et al. | 320/2 X |
| 5,049,802 | 9/1991 | Mintus et al. | 320/2 |

FOREIGN PATENT DOCUMENTS

| | | | |
|---|---|---|---|
| 2659817 | 3/1978 | Fed. Rep. of Germany | 320/2 |
| 0036114 | 3/1980 | Japan | 320/2 |
| 0201719 | 12/1982 | Japan | 320/2 |
| 0218303 | 9/1986 | Japan | 320/2 |
| 0287607 | 11/1988 | Japan | 320/2 |
| 0648520 | 3/1985 | Switzerland | 320/5 |

*Primary Examiner*—Kristine L. Peckman
*Attorney, Agent, or Firm*—L. A. Alkov; W. K. Denson-Low

[57] ABSTRACT

An inductive charge port for an electric vehicle in which part of the inductive coupling transformer core is attached to the inside of an access door on the vehicle, and wherein only a primary coil assembly is inserted into the charging device when charging the vehicle. The charge port includes a primary coil assembly having a primary winding that is coupled by way of an electrical cable to a power source, and a secondary coil assembly disposed in the vehicle. A housing in the vehicle has the secondary coil assembly disposed therein. The secondary coil assembly includes a transformer core having a first portion disposed in the housing. A secondary winding is disposed in a cavity in the first portion of the transformer core which receives the primary winding therein. A hinged access door has a compressible, resilient member disposed on its inner wall and a second portion of the transformer core is secured to the compressible member. The second portion of the transformer core forms a lid or cap that mates with the first portion to form a complete transformer core. The mating first and second portions tightly secure the primary winding in the cavity when the door is closed. The secondary winding is coupled by way of an electrical cable to a charging circuit that is coupled to a battery of the vehicle. When the primary coil is inserted into the cavity and the external power source is energized, power flows from the power source through the inductive charge port to the battery. The present invention provides for an easy and safe inductive coupling that eliminates the possibility of shock hazard to a user when recharging the electric vehicle.

5 Claims, 1 Drawing Sheet

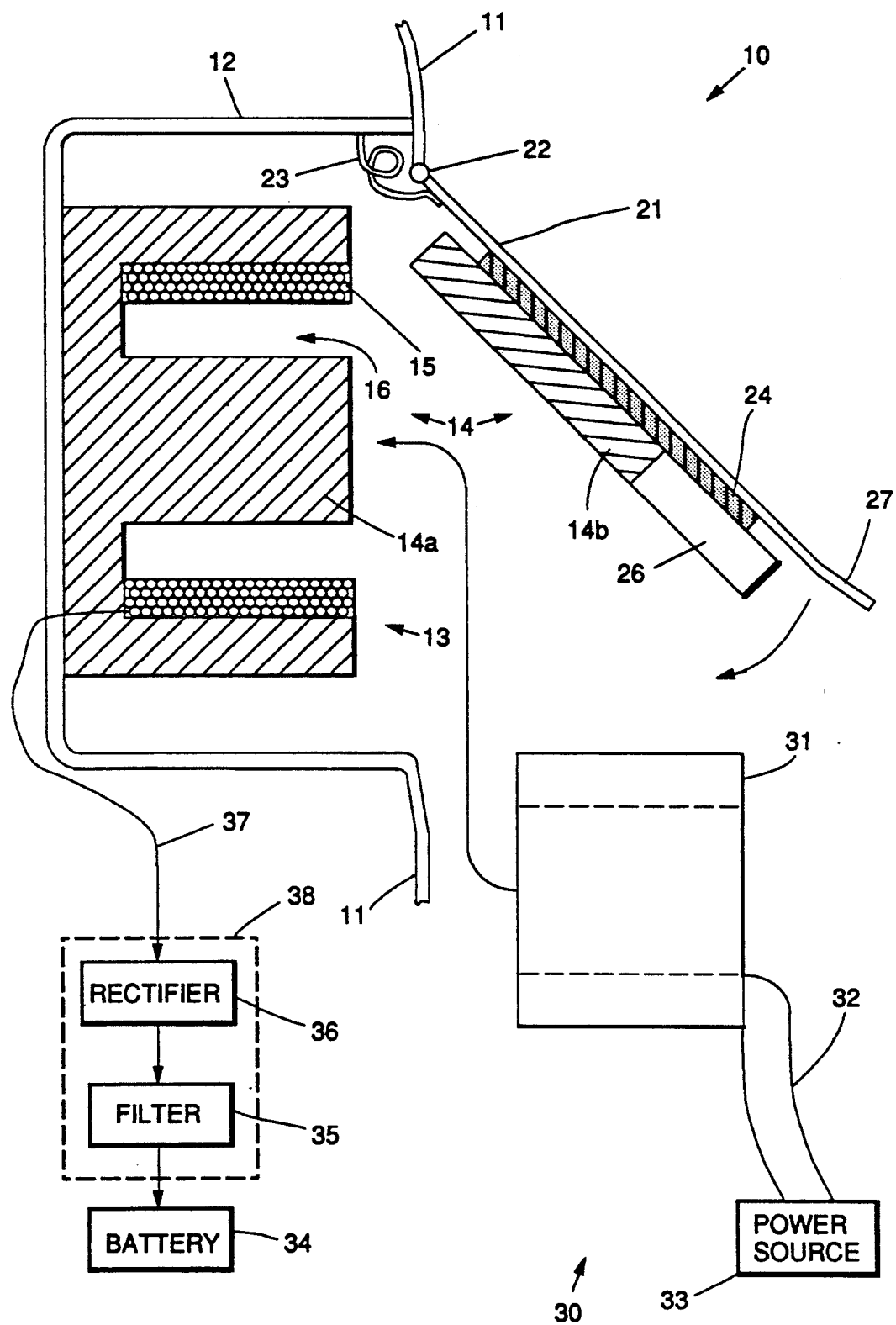

ELECTRIC VEHICLE INDUCTIVE COUPLING CHARGE PORT

BACKGROUND

The present invention relates to inductive couplers, and more particularly to an inductive charge port that is adapted for use with electric automobile propulsion battery charging systems, and the like.

With the development of electric powered automobiles and the push towards their production for relatively widespread consumer use within the next ten years, there is a need for a means to easily charge the propulsion batteries contained therein. Conventional battery charging devices are not well suited for this purpose. Conventional battery chargers are not designed for frequent use by consumers and thus it is not easy to charge a propulsion battery on a regular basis using conventional chargers.

Previous inductive coupling concepts split the inductive coupling transformer into two halves, each containing a coil and part of the transformer core. This results in a much larger, heavier assembly that the user must handle when recharging the vehicle. A separable inductive coupler was developed by the assignee of the present invention for sub-sea applications by the U.S. Navy. This coupler operated at 60 Hz and thus the design was not optimized for high frequency or high power operation. The power transfer density of this coupler is about 2 Watts per cubic inch, which is insufficient to quickly recharge an automobile propulsion battery. This design is not well-suited for automobile applications.

Other inductive couplers and charging systems are disclosed in U.S. patent application Ser. No. 07/823,949, entitled "Hand-Held Inductive Charger Having Concentric Windings", filed Jan. 22, 1992, U.S. patent application Ser. No. 07/823,944, entitled "Separable Inductive Coupler", filed Jan. 22, 1992, U.S. patent application Ser. No. 07/823,948, entitled "Hand-Held Inductive Charger Having Flat Mating Cores", filed Jan. 22, 1992, U.S. patent application Ser. No. 07/823,950, entitled "Wall/Ceiling Mounted Inductive Charger", filed Jan. 22, 1992, and U.S. patent application Ser. No. 07/823,945, entitled "Weatherized Curb-Side Charger", filed Jan. 22, 1992, all of which are assigned to the assignee of the present invention.

Consequently, it is an objective of the present invention to provide for an inductive charge port that is adapted for use in an automobile propulsion battery charging device, or the like, that is simple to use and is adapted to efficiently charge an automobile battery employed to propel an electrically powered automobile.

SUMMARY OF THE INVENTION

In order to meet the above and other objectives, the present invention comprises inductive charging apparatus that comprises an inductive charge port for an electric vehicle in which part of the inductive coupling transformer core is attached to the inside of an access door on the vehicle, and wherein only the primary coil assembly is inserted into the charging device when charging the vehicle. More specifically, the present inductive charge port comprises a hand-held primary coil assembly, and a secondary coil assembly that is disposed in the vehicle. The primary coil assembly includes a primary winding that is coupled by way of an electrical cable to a power source. A housing is formed in the vehicle and the secondary coil assembly is disposed therein. The secondary coil assembly comprises a transformer core having a first portion disposed in the housing. A secondary winding is disposed in a cavity in the first portion of the transformer core. The cavity is adapted to receive the primary winding therein.

A hinged access door is provided and a compressible or resilient member is coupled thereto an a second portion of the transformer core is secured thereto. The second portion of the transformer core forms a lid or cap that mates with the first portion of the transformer core to form a complete transformer core. The mating first and second portions are adapted to tightly secure the primary winding in the cavity when the door is closed.

The secondary winding is coupled by way of an electrical cable to a charging circuit comprising a rectifier and a filter. The filter is coupled to a battery of the vehicle 11 to close the electrical path from the power source to the battery. When the primary coil is inserted into the cavity and the external power source is energized, power flows from the power source through the inductive charge port to the battery.

Using inductive coupling by means of the inductive charge port of the present invention eliminates any possibility of shock hazard to a user when recharging the electric vehicle. The present invention makes it feasible for only the primary coil to be attached to the power cable, thus greatly reducing size and weight of the portion of the device that is handled by the user. Another advantage of the present invention is its ease of cooling, since the entire transformer is contained inside the vehicle during charging. This makes possible further size and weight reduction. In addition EMI shielding is easy because the transformer is completely inside the vehicle.

The inductive charge port of the present invention allows a user of an electric vehicle to easily charge its propulsion battery. One advantage of the inductive charge port is in allowing the electric vehicle to be charged safely without any type of conventional electrical plug. The inductive charge port of the present invention thus provides a safe, convenient means for coupling power from a power source to an electric vehicle to recharge its propulsion battery.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which the sole FIGURE of the drawing illustrates an inductive charge port for an electric vehicle in accordance with the principles of the present invention.

DETAILED DESCRIPTION

Referring to the sole FIGURE of the drawing, the present invention comprises an inductive charge port 10 for an electric vehicle 11 (only a portion of the vehicle 11 is shown in the drawing). A primary coil assembly 30 comprising a cylindrical doughnut-shaped primary winding 31 is provided that is housed external to the inductive charge port 10. The primary winding 31 is coupled by way of an electrical cable 32 to an external power source 33. Copper, for example, may be used for the primary winding 31. The primary winding and electrical cable 32 are adapted to couple power to the battery 34 of the electric vehicle 11 from the external power source 33.

A housing 12 or cavity 12 is formed in the body of the vehicle 11 and a secondary coil assembly 13 of the inductive charge port 10 is disposed therein. The housing 12 may be made of metal, for example, that is attached to the vehicle 11 in a conventional manner, such as by welding, for example. The housing 12 is generally made of a material that provides for EMI shielding, to prevent the emission of RF radiation caused by operation of the present invention at relatively high frequencies. The secondary coil assembly 13 comprises a cylindrical, for example, transformer core 14 having a first portion 14a that is disposed in the housing 12. A circular, for example, secondary winding 15 is disposed in a doughnut-shaped cavity 16 in the first portion 14a transformer core 14. The transformer core 14 may be comprised of ferrite material, for example. The doughnut-shaped cavity 16 forms a gap between the first portion 14a of the transformer core 14 and the secondary winding 15 that is adapted to receive the cylindrical primary winding 31 that is inserted into the cavity 16.

An access door 21 is coupled to the body of the vehicle 11 by means of a rotating joint or hinge 22 and a spring 23, for example, which holds the door 21 in an open position when it is opened. On the inside of the door 21 is disposed a compressible or resilient member 24, which may be a sponge rubber material, for example, and to which is secured a second portion 14b of the transformer core 14. The second portion 14b of the transformer core 14 forms a lid or cap that mates with the first portion 14a of the core 14 to form a completed operational transformer core 14. The mating first and second portions 14a, 14b of the transformer core 14 are adapted to tightly secure the primary winding 31 in the cavity 12 of the secondary coil assembly 13 when the door 21 is closed. The second portion 14b of the transformer core 14 has a cutout 26 formed therein through which the power cable 32 extends when the lid 21 is closed and the power source 32 is energized to charge the battery 34.

The secondary winding 15 is coupled by way of an electrical cable 37 to a charging circuit 38 comprising a rectifier 36 and a filter 35. An output of the filter 35 is coupled to the battery 34 to close the electrical path from the power source 32 to the battery 34. When the primary coil 31 is inserted into the cavity 16 and the external power source 33 is energized, power flows from the power source 33 through the inductive charge port 10 and to the battery 34.

The access door 21 of the inductive charge port 10 is similar to a gasoline filler access door in a conventional automobile. In operation, a user opens this door 21, inserts the primary coil assembly 31 into the cavity 16 between the transformer core 14 and the secondary coil 15 and then closes the door 21 to allow for recharging of the battery 34. The door 21 is spring loaded to keep the first and second portions 14a, 14b of the transformer core 14 in contact with each other. The second portion 14b of the transformer core 14 is attached by the compressible member 24 to the inside of the access door 21 to further insure complete contact of the first and second portions 14a, 14b. The size of the cutout 26 in the second portion 14b of the transformer core 14 is such that the power cable 32 connected to the primary coil assembly 30 is easily inserted into the gap 16 and the door 21 properly closes such that full contact is made between the first and second portions 14a, 14b of the transformer core 14. In addition, the door 21 has a lip 27 so that it can be closed with the power cable 32 in place. The power cable 32 is shielded to prevent the emission of RF radiation due to the high frequency operation of the present invention.

Thus there has been described a new and improved inductive charge port for use with electric automobile propulsion battery charging systems, and the like. It is to be understood that the above-described embodiment is merely illustrative of some of the many specific embodiments which represent applications of the principles of the present invention. For example, although cylindrical components have been described in the above described embodiment of the present invention. It is to be understood that differing shaped components may be employed in the present invention without detrimental effect on the operation thereof. Clearly, numerous and other arrangements can be readily devised by those skilled in the art without departing from the scope of the invention.

What is claimed is:

1. Inductive charging apparatus that couples electrical power from a power source to a battery of an electric vehicle, said apparatus comprising:
    a primary coil assembly comprising a removable primary winding and an electrical cable coupled between the primary winding and the power source; and
    a secondary coil assembly comprising a housing disposed in the vehicle, a transformer core having a first portion disposed in the housing that has a cavity disposed therein, a secondary winding disposed in the cavity that is coupled to the battery of the electric vehicle and wherein a gap is formed between the secondary winding and the transformer core that receives the primary winding therein, a second portion of the transformer core that is mounted to a door of the vehicle by means of compressible material and said second portion mates with the first portion and secures the primary winding in the gap of the transformer core when the door is closed;
    and wherein the primary and second coil assemblies form a transformer when the respective primary and secondary windings are mated.

2. The inductive charging apparatus of claim 1 further comprising:
    a charging circuit comprising a rectifier and a filter coupoled between the secondary winding and the battery.

3. The inductive charging apparatus of claim 1 further comprising:
    a hinge and a spring coupled between the door and the housing that holds the door in an open position.

4. The inductive charging apparatus of claim 1 wherein the compressible material comprises a sponge rubber material.

5. The inductive charging apparatus of claim 1 wherein the housing comprises metal that provides for EMI shielding.

* * * * *